April 7, 1936.   V. W. MOODY   2,036,429
INSULATING BOX
Filed April 6, 1933   3 Sheets-Sheet 1
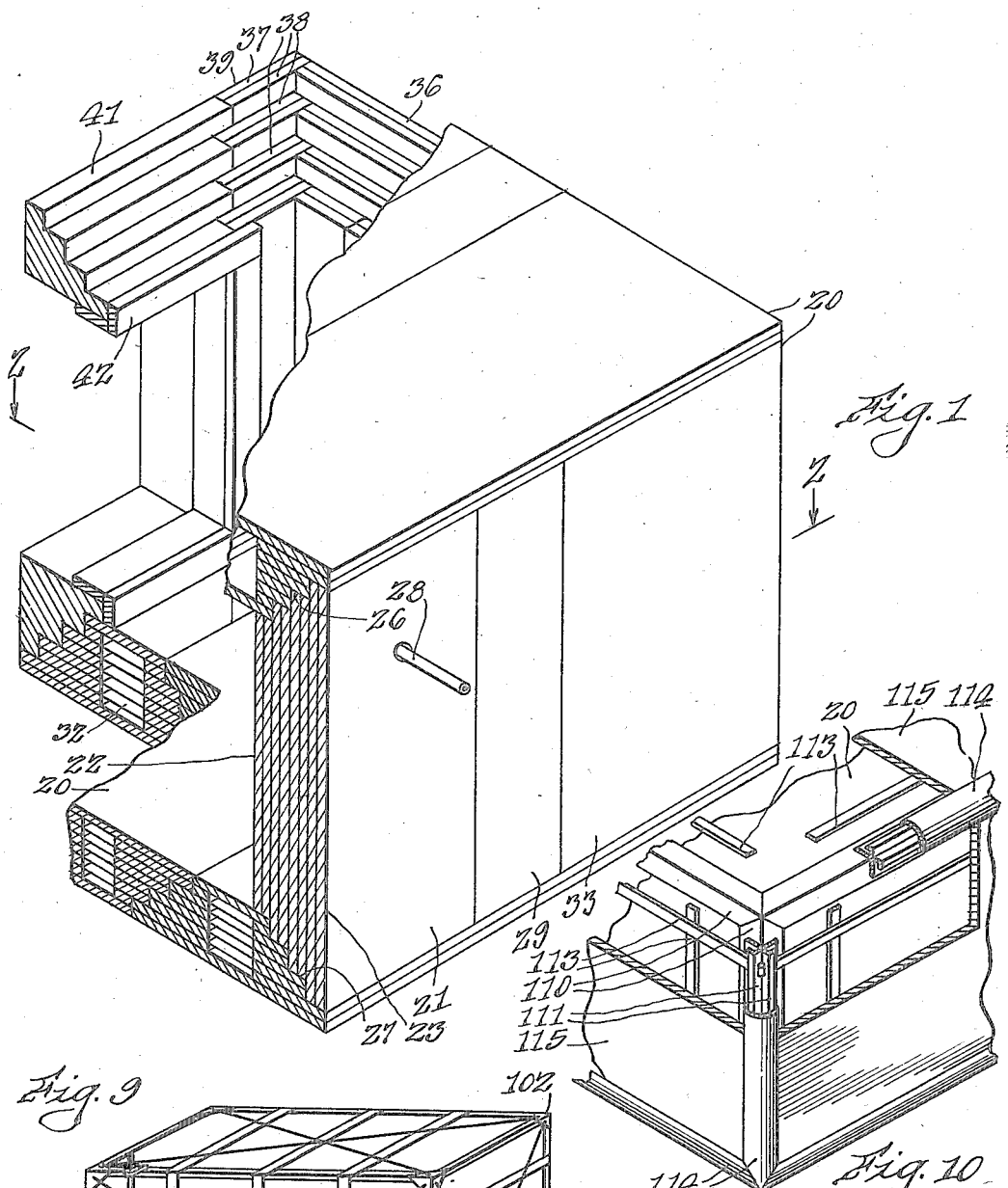
Fig. 1
Fig. 10
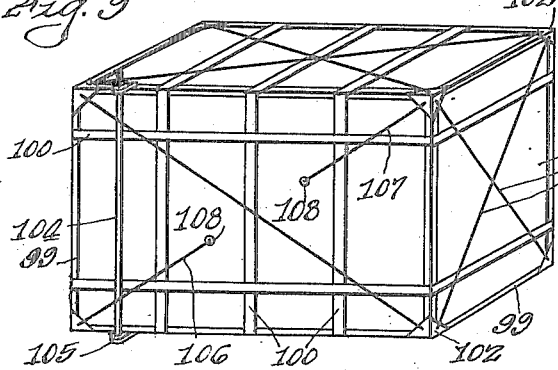
Fig. 9
Inventor:
Virginius W. Moody
By Lloyd
Atty April 7, 1936. V. W. MOODY 2,036,429
INSULATING BOX
Filed April 6, 1933 3 Sheets-Sheet 2
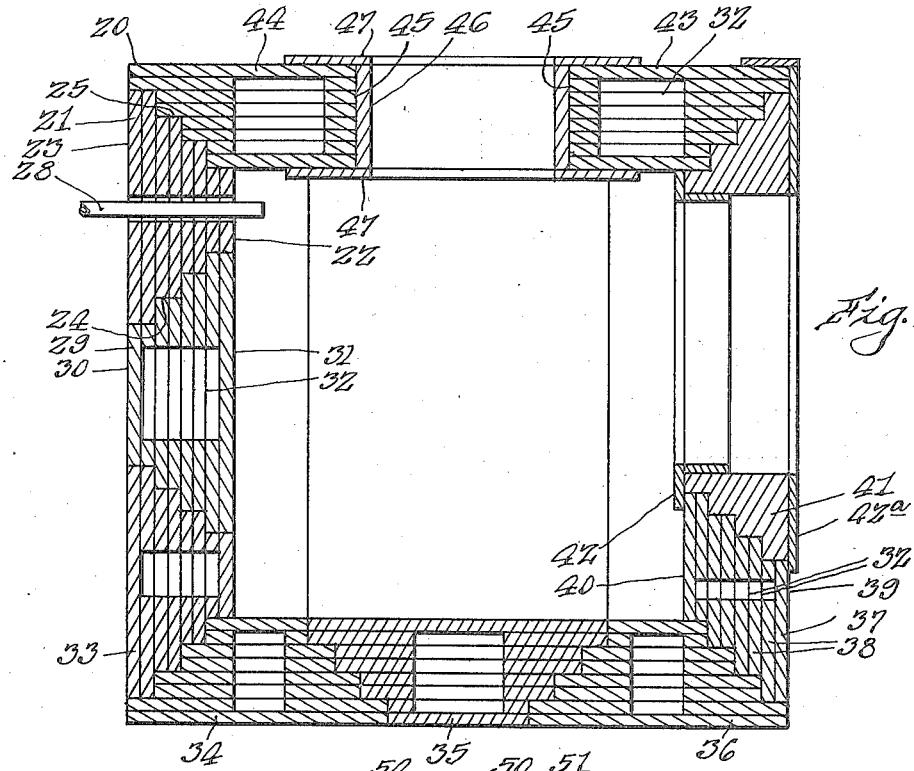
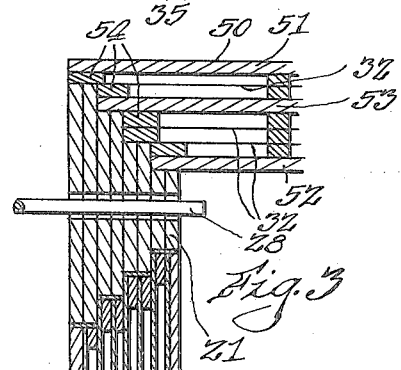
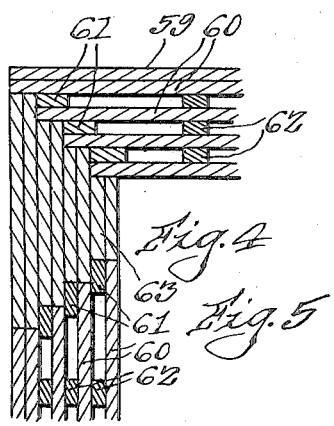
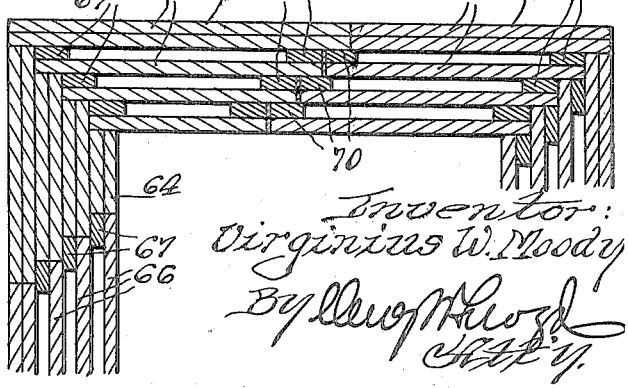

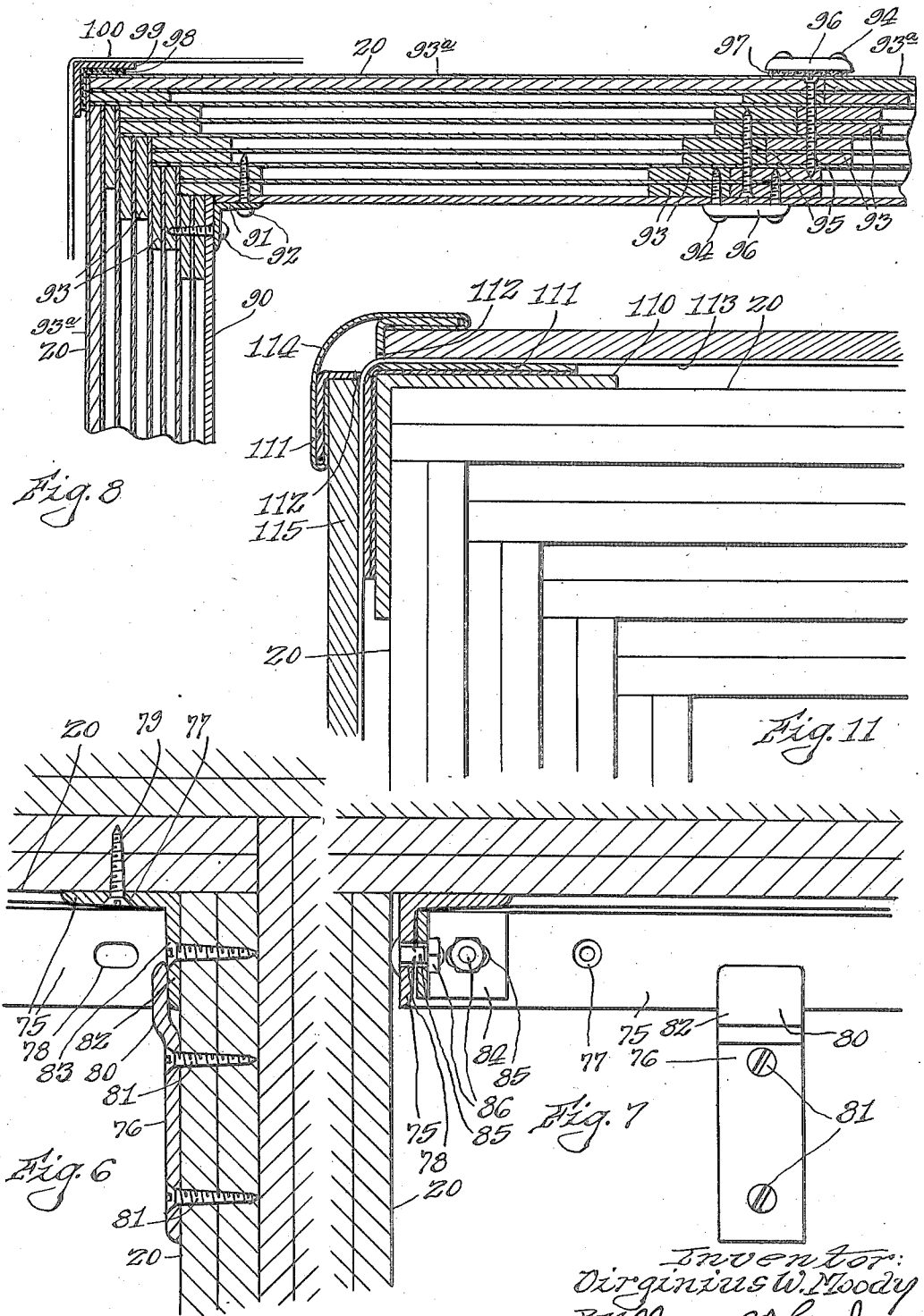

Patented Apr. 7, 1936

2,036,429

UNITED STATES PATENT OFFICE 2,036,429

INSULATING BOX

Virginius W. Moody, Jackson Heights, N. Y., assignor to Reynolds Research Corporation, New York, N. Y., a corporation of Delaware Application April 6, 1933, Serial No. 664,729

17 Claims. (Cl. 217—17)

This invention has to do with an improved type of wall structure for enclosing spaces to provide insulation from temperature effects.

With the growth of the refrigerating industry due to the success of mechanical refrigeration and the development of better refrigerants, there have been many improvements in the construction of insulating walls comprising an indispensable part of the refrigerating art. Improvement in refrigeration has led to many new uses. There has also been an increase in the dimensions of insulated spaces. Whole buildings and other enclosed spaces now are insulated against radical temperature changes.

With the demand for insulation for larger spaces has grown a need for suitable walls for enclosing such spaces. The insulating quality of such a wall is important, as is also the cost of materials from which it is made and the expense of labor necessary for its construction.

Insulating walls are not limited to the refrigerating art. Such walls are equally useful for precluding the passage of heat from as well as to a space enclosed thereby. When, for instance, walls constructed after the fashion of the present invention are used in a dwelling house or other building, they may serve as an impediment to the ingress or egress of heat, depending upon the season of the year or the temperature of the outside atmosphere.

Among the objects of the present invention is the provision of:

An improved construction for a heat insulating wall in which units may be added one to another to obtain selected dimensions.

An insulating unit of novel construction that is adapted to be assembled with other similarly constructed units to provide an insulating wall.

A new form of insulating unit with a stepped beveled edge arranged for assembly with other similarly constructed units to provide a wall, the stepped edges of said units fitting hermetically to one another.

A novel insulating wall construction comprising insulatory units having opposed parallel faces to form the inner and outer surfaces of said wall, the two faces of said units being of different area, and the said units being capable of assembly so that the face of larger area of one unit lies adjacently to the face of smaller area of the next unit.

An insulating wall comprising insulatory units providing opposed stepped edges and spaced-apart laminations extending between said edges, the units fitting into such wall with the steps of said edges disposed in close proximity.

A wall construction of the kind just described and in which the spaced-apart laminations are provided with a bright metallic surface.

An improved means for enclosing a space for heat insulation and comprising walls of any of the above described types having complemental fastening means extending from adjacent walls to hold proximate units in assembled relation.

These and other desirable objects are obtained by the novel construction, improved combination, and unique arrangement of the several elements described in the accompanying three sheets of drawings hereby made a part of this specification which are illustrative of several forms of the invention.

In said drawings:

Figure 1 is a perspective view of one form of the invention with parts broken away to illustrate its assembly;

Figure 2 is a section of the form of the invention shown in Figure 1 and taken at the line 2—2 thereof;

Figure 3 illustrates a different form of insulating unit that may be employed;

Figures 4 and 5 show still different forms of insulating units within the scope of the invention;

Figures 6 and 7 are fragmentary sections taken at a corner of walls made of insulating units forming the subject matter of the invention and showing complementary members assisting in such wall assembly;

Figure 8 discloses an alternate means for joining insulating units into a wall;

Figure 9 shows different means for maintaining a device of the present kind in assembly;

Figure 10 shows a combination covering and binding means for maintaining one form of the invention in assembly; and Figure 11 is a view in cross section taken on the line 11—11 in Figure 10.

Like reference characters are used to designate similar parts in the drawings and in the description which follows.

Reference will first be had to Figures 1 and 2 in which one form of the invention in general assembly is shown. The form of the invention illustrated in these two figures comprises six walls 20, which may be of similar construction. Each wall 20, in the present disclosure, comprises a plurality of longitudinally extending insulating units. Three of such units are shown in the wall at the left side of Figure 2.

Unit 21 may be constructed from a solid block, or from laminations of a solid insulating material as shown.

Whatever may be the internal structure of a unit, such as the unit 21, the edges 24, 25, 26 and 27 thereof are stepped in a fashion to make them beveled. Opposite faces 22 and 23 of unit 21 are parallel, face 22 being of smaller area than face 23 because of the beveled edges 24, 25, 26, and 27. Usually there will be one or more solid blocks as 21 in a finished device to provide apertures for a pipe 28 or the like.

Adjacent to unit 21 is unit 29 of the same general contour of unit 21. Opposite parallel faces of the unit 29 may be formed of panels 30 and 31, which may be of wood or other insulating material. Circumscribing the lateral edges of unit 29 are stepped beveled edges, which are formed of slabs of wood or other suitable insulating material.

The interior of unit 29 is hollow and divided into air spaces by thin panels of insulating material such as cardboard. Other material may be substituted for cardboard. To either or both faces of the thin panels 32 will usually be applied a bright metallic cover or face. The bright surface, which may be a sheet of metal foil, impedes the propagation of radiant heat to or from the interior of the box. (Hereinafter, a device formed of a plurality of units will be referred to as a box. However, the term "box" is to be understood as embracing any type of device or structure for the enclosing of space to be insulated.)

Unit 33 is constructed similarly to unit 29, and hence needs no further description. Units 21, 29 and 33 are preferably of the same thickness so that they may be assembled to provide a wall of uniform thickness. In order for the stepped edges of the said units to fit closely and hermetically together it is, of course, necessary that the edges have complemental steps of identical dimensions. If the steps of each unit are of the same size and shape, it follows that the angularity of the beveled edges will be the same.

It is to be noted that units 21, 29, and 33 are fitted together by reversing adjacent units; that is, with the broad face of one unit disposed inwardly of the box and with the narrow face of the next unit presented inwardly and so on in alternate order. The wall of a box may be made any desired height by adding panels in the manner described.

In the lower side of the box, Figure 2, are three units 34, 35, and 36 which are of similar construction. The fact that the distance between opposed edges of any of the units 32, 33, 34, 35 or 36 may differ slightly does not affect their similarity of construction. Because the lateral stepped edges of unit 34 are of the same dimensions as the stepped edges of unit 33, these two units may be fitted together either in the manner illustrated to form a corner, or they may be fitted together in reversed order as are units 29 and 33 and thereby continue as a section of a straight wall.

Unit 37 differs from the units heretofore described in that its two longitudinal stepped edges are disposed in parallelism instead of in a converging relationship. The steps at the opposite edges of unit 37 are formed of blocks 38. Panels 39 and 40 form the outer and inner faces of block or unit 37. Elements 32, heretofore described, and which may have metal foil upon their surface, are for dividing the interior of unit 37 into independent air spaces.

Adjoining an edge of unit 37 is a side of a door frame 41. The sides of such frame are stepped so that it may be placed in close assembly with the insulatory units at its sides. Door frame member 41 may be constructed from a solid piece or pieces, or it may be laminations (not shown) to effect stepped edges. In Figure 1, it may be noted that the upper and lower edges of door frame 41 are beveled and stepped so as to virtually form a continuation of the steps in the upper and lower edges of member 37. A door stop 42 is placed near the inner edge of the opening in member 41. The outer face of member 41 is covered by a door facing 42a.

In the upper wall of the device, shown in Figure 2, is a second form of door opening. At either side of such opening are identically shaped units 43 and 44, each having a square edge 45 disposed toward the door opening and an oblique stepped edge disposed away from the opening. The stepped edge of unit 43 engages door frame member 41 whereas the stepped edge of unit 44 engages the stepped edge of unit 21. The interior of units 43 and 44 are provided with spacer members 32 of the type hereinabove described. Door sashing member 46 and door facing members 47 are placed about the opening between units 43 and 44.

The device need not be made from members of the exact construction already shown. For example, in Figure 3 there is shown a unit 50 including slabs 51, 52, and 53 and blocks 54 for spacing the slabs. Intermediate the slabs, which may be of wood or other insulatory material, or part of them wood and part of other insulatory material, are spacer members 32. The spacer members 32 may be provided with a bright metallic surface.

Figure 4 illustrates units 59 having slabs 60 of wood or fiber or other insulating material. If desired, part of the slabs 60 may be of one kind of material and part of another material. Spacing of the members is had by means of the blocks 61 at the edges thereof; further assurance of the spacing of the slabs and a reinforcing of the units is had by blocks 62 between central portions of the slabs. Between units having slabs 60 is shown a unit 63, the latter being similar to unit 21 shown in Figures 1, 2, and 3.

In the fragmentary wall structure shown in Figure 5 is a unit 64 similar to unit 63. Adjoining opposite edges of unit 64 are identical units 65, one of said units 65 presenting its broader face to the inner side of the box and the other of said units presenting its narrow face to the inner side of the box. Units 65 comprise slabs 66, which may be of the same material as the slabs 60, Figure 4. Spacer members, in the form of strips or blocks 67, separate slabs 66. A difference between units 65 and 59 is the omission of reinforcing members from between the central sections of the slabs.

Connecting the right edge of unit 64 is a unit designated by the ordinal 68. Slabs 69, which may be of the same material or materials as slabs 60 or 66, are held in spaced relation by spacer members 70. Unit 65 differs, with respect to unit 68, in that it configures a trapezoid in section whereas unit 68 is shaped, in section, like a parallelogram.

For assembling boxes of the character being described, locking members 75 and 76, shown in Figures 6 and 7, have proved proficient. Members 75 comprise straight pieces of angle iron having round apertures 77 in one flange and elongated apertures near the ends of the other flange thereof. As the units are placed into each wall, they are, if the apparatus now to be described is used in the assembly of a box, bound together along one or more edges by a member 75. Screws 79 may be passed through apertures 77 to secure the member 75 to each of the wall units. Usually each of the four inner edges of two opposed walls of the box will have a member 75 attached therealong by means of the screws 79. At selectively spaced intervals on the four walls of the box to be joined to the edges of the wall, to which the angle irons are attached, will be placed members 76 with the raised portions 80 thereof directed toward the wall edge.

Screws 81 may be employed for holding members 76 in position to their walls. Thereafter, a wall having members 75 thereon at its four edges is brought into position with a wall with which it is to be joined, thus providing for the insertion of the projecting flanges 82 of members 75 beneath the raised portions 80 of the members 76. When the flanges 82 are inserted beneath the raised portions 80, the latter are sprung slightly from the wall to which they are attached so that they frictionally engage the flanges 82 to thereby hold the walls temporarily in place.

Thereafter, bands, later to be described, or other means, are used for drawing the walls of the box closely together. After the walls have been so drawn together, screws 83 may be inserted through the projecting flanges 82 of members 75 as a means for permanently holding the box in assembly.

The side of the box opposite to the side bearing members 75 may similarly bear such members to coact with other members 76 upon the walls extending between the said opposed sides.

In Figure 7 is shown an angle clip 84 having elongated apertures 85 for registering with apertures 78 at adjacent ends of two members 75. After the said bands have been used for drawing the walls of the box together, bolts 86 may be used for connecting the angle clips 84 to the ends of the members 75. Greater rigidity is thereby given to the structure.

Figure 8 illustrates an alternate method of assembling the units into the walls of a box. If desired, units may be placed about a box lining member 90. In the corners of the lining member 90 may be placed angle strips 91 for the reception of screws 92. Screws 92 extend into the spacing members 93 of the units 93a to hold the units in place to the angle iron and to the lining 90. Where units are fastened together between the corners of the box, screws 94 and 95 may be used.

Screws 95 are longer than screws 94 but are not long enough to pass entirely through the two units at their junction. Batten pieces 96 may be used for covering the cracks between the units for preventing the passage of air therebetween. If the liner member 90 does not have sections joining at the line of joinder of the units, the inner batten may be obviated. The outer batten member 96 may have a gasket 97 thereunder to preclude the passage of air and moisture into the joint between the members. The gasket 97 further serves the purpose of a cushion member to permit slight expansion and contraction of the units without the causing of damage thereto because of strain.

At the corner of the construction shown in Figure 8, is a gasket 98 for serving the same purpose as gasket 97, there being an angle strip 99 over gasket 98 and a steel band 100 passing over the angle strip 99. The band 100 may be anchored to suitable points upon the box or it may be passed entirely around the box.

Figure 9 discloses a plurality of steel bands 100 and illustrates the manner in which they may be passed around the box 101 and angle strips 99. Also, in Figure 9, are shown pieces 102 for fitting over the corners of the box. Such pieces 102 serve as anchors for wires 103 or the like.

Still another means for holding the box in assembly comprises a rod 104 having threaded ends for engaging threaded apertures in plates 105 which may be attached to opposite sides of the box in any suitable manner. It is to be noted that the wire or bands 106 and 107 are anchored at intermediate points 108 and at a side of the box 101. Such points of anchorage may prove useful in the event that it is not desired to have the wires extending from opposite corner plates to cross a door opening to the box. Any one or all of the means for holding the units in place that are illustrated in Figure 9 may be selected or any other means for holding the box in assembly may be used. Especially are the holding means, illustrated in Figure 9, adapted for rapid connection to the box and to the use therewith when the box is to form a wall or wall lining for a building structure. The invention is in no way limited to any particular type of means herein illustrated for maintaining the device in assembly.

Figures 10 and 11 show other means for securing the box in assembled position and for simultaneously providing means for the attachment of panels to the sides of the box. Along each corner of the box is provided an angle iron 110 to which are soldered or otherwise fastened channel pieces 111. Apertures 112 may be formed within the webs of channel members 111 to provide for the passing of tension bands 113 about the box. A neat appearing corner covering is provided by strips 114 which may have their longitudinal edges doubled one hundred eighty degrees to extend beneath the flanges of the channel members 111.

Panels 115 may be held to the sides of the box by inserting their edges between the opposed flanges of the channel members 111. In addition to forming protection for the box, the panels 115 may be used to advantage to add to the appearance of the box, or printed advertising matter may be placed upon the panels. If one of the flanges at a side of the box, usually a flange at a vertical edge or horizontal top edge, is eliminated, the panel 115 may be slipped from that side to have the decorating or advertising matter thereon changed. Or, the removed panel may be replaced by another having new matter thereon.

What is claimed as new and is desired to be secured by Letters Patent of the United States is:

1. An insulating structure comprising walls, a plurality of heat insulatory units forming each of said walls, each of said units having the form of a truncated pyramid and possessing parallel opposed faces and stepped edges, each of said units comprising a frame and spaced apart sheets of insulating material having a bright metallic surface stretched across said frame, said sheets extending between said stepped edges and in parallelism with said parallel faces, and means for maintaining the assembly of said units in such walls, the parallel faces of said units forming the inner and outer surfaces of said walls and the edges of adjacent units fitting together.

2. An insulating structure comprising walls of insulating units and joined complementally together at a corner, each of said units having opposite parallel faces and comprising a perimetric frame having stepped beveled exterior edges and thin spaced-apart sheets of insulating material interiorly of said frame in parallelism with such faces, the faces of said units being at the inner and outer sides of their respective walls and the stepped beveled edges of adjacent units fitting closely together, means for holding said walls in assembly comprising an angle member extending longitudinally of said corner to embrace adjacent marginal sections of said walls within the flanges thereof, channel members secured to the flanges of said angle member to place the webs thereof contiguously to and in parallelism with the longitudinal corner in said angle member, panels for covering said walls, and strips of ductile molding material in sheet form, said panels having respective edges inserted between the flanges of said channel members to extend toward said webs, and said strip of molding material covering the outer flanges of said channel members and having the longitudinal edges thereof disposed about and under the edges of said outer flanges.

3. An insulating structure comprising walls of insulating units and joined complementally together at a corner, each of said units having opposite parallel faces and comprising a perimetric frame having stepped beveled exterior edges and thin spaced-apart sheets of insulating material interiorly of said frame in parallelism with such faces, the faces of said units being at the inner and outer sides of their respective walls and the stepped beveled edges of adjacent units fitting closely together, means for holding said walls in assembly comprising an angle member extending longitudinally of said corner to embrace adjacent marginal sections of said walls within the flanges thereof, channel members secured to the flanges of said angle member to place the webs thereof contiguously to and in parallelism with the longitudinal corner in said angle member, there being apertures in the webs of said channel members, tension members passing about said walls by way of said apertures, panels for covering said walls, and strips of ductile molding material in sheet form, said panels having respective edges inserted between the flanges of said channel members to extend toward said web, and said strip of molding material covering the outer flanges of said channel members and having the longitudinal edges thereof disposed about and under the edges of said outer flanges.

4. An insulating structure comprising a plurality of walls of insulating units and joined complementally together at corners of said structure, each of said units having opposite parallel faces and comprising a frame about the edge thereof providing steps in such edge and thin spaced-apart sheets of insulating material internally of said frame in parallelism with such faces, the stepped edges of said units being fitted together with the whole surface of the opposed stepped edges of adjacent units being in contiguity and the faces of said units forming the outer and inner sides of their respective walls, means for holding said walls in assembly comprising angle members extending longitudinally of the corners of said structure to embrace narrow sections of adjacent walls within the flanges thereof, channel members secured to the flanges of said angle members to place the webs thereof adjacent to and in parallelism with the corners of said angle members, panels for covering said walls, said panels having their edges inserted between the flanges of said channels about an edge of a wall, strip-like sheets of ductile molding material covering the outer flanges of said channels at each corner by being molded about such corners and having their longitudinal edges disposed under the edges of said outer flanges, there being no channel member at an edge of one of said walls thereby adapting the insertion and withdrawal of the panel for covering such wall.

5. A wall comprising a series of units of insulating material, each unit having beveled edges and a large and a small face, one unit having its large face in one direction and a contiguous unit having its small face in the same direction, the faces of said units providing continuous parallel outer and inner surfaces for said wall.

6. A wall comprising a series of units of insulating material, each unit having beveled edges approximating forty-five degrees and having a large and a small face, one unit having its large face in one direction and a contiguous unit having its small face in the same direction, the faces of said units providing continuous parallel outer and inner surfaces for said wall.

7. A flat wall comprising a series of units of insulating material, each unit comprising a truncated pyramid and one unit having its base in one direction and a contiguous unit having its top in the same direction.

8. A flat wall comprising a series of units of insulating material, each unit comprising a truncated pyramid and having edges with a series of steps therein one unit having its base in one direction and a contiguous unit having its top in the same direction, the steps in one unit being complemental to the steps in the contiguous units.

9. A box comprising walls, each wall comprising a series of insulating units, each unit comprising a truncated pyramid, one unit in each wall having its base in one direction and a contiguous unit having its top in the same direction, and the intersecting corners of said walls comprising units at ninety degree angles with their contacting beveled edges in parallelism.

10. A flat wall comprising a series of insulating units, each unit comprising laminations of foil and an enclosing housing therefor, the enclosing housings in contact one with another having complemental interfitting edges.

11. A flat wall comprising a series of insulating units, each unit comprising a frame, spaced apart laminations of foil in each frame and parallel to the surfaces of said wall, said frames having beveled edges and each frame having a large and a small face, one frame having its large face in one direction and an adjacent frame having its small face in the same direction, said frames interfitting at their edges.

12. A box comprising a plurality of walls, each wall comprising three or more insulating units, each unit comprising a truncated pyramid having an outer protective frame and parallel sheets of foil therewithin, one frame in a wall having its base in one direction and a contiguous frame in said wall having its top in the same direction, certain of said frames meeting at an angle of ninety degrees at the intersections of walls.

13. A unit for constructing the walls of an insulating box and comprising a truncated pyramid having four sides, said unit comprising perimetric frame members and spaced apart sheets of material within said frame and parallel to the inner and outer edges thereof.

14. The insulating unit described in claim 13, and in which said sheets of material comprise foil.

15. The insulating unit described in claim 13, and in which said frame members have stepped outer surfaces and are adapted to interfit with the stepped surfaces of other units comprising truncated pyramids in alignment therewith and having bases and tops turned in directions respectively opposite to directions of base and top of said unit, whereby to provide a wall having parallel faces.

16. The insulating unit described in claim 13, and in which said frame members provide a stepped edge at forty-five degrees angle to the faces of said unit and adapted to interfit with the stepped edge of another unit comprising a truncated pyramid for disposition in alignment therewith or normal thereto.

17. An insulatory wall comprising a plurality of units having non-diathermic perimetric frames and membranous laminations encompassed and held taut in said frames, the units being of different sizes and shapes but being generally truncated pyramids, the oblique frames having stepped outer faces, and the faces of the different units being complemental and registering one with another either in alignment or with one unit normal to the other, the edges of adjacent units being joined together to seal the air spaces therebetween.

VIRGINIUS W. MOODY.